(12) United States Patent
Brookman

(10) Patent No.: US 8,667,739 B2
(45) Date of Patent: Mar. 11, 2014

(54) FLUSH QUARTER GLASS SEAL

(75) Inventor: Marc Brookman, Livonia, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 502 days.

(21) Appl. No.: 13/003,703

(22) PCT Filed: Jul. 10, 2009

(86) PCT No.: PCT/US2009/050250
§ 371 (c)(1),
(2), (4) Date: Apr. 26, 2011

(87) PCT Pub. No.: WO2010/006257
PCT Pub. Date: Jan. 14, 2010

(65) Prior Publication Data
US 2011/0187060 A1 Aug. 4, 2011

Related U.S. Application Data

(60) Provisional application No. 61/080,123, filed on Jul. 11, 2008.

(51) Int. Cl.
*E06B 7/232* (2006.01)

(52) U.S. Cl.
USPC .......................................... 49/496.1; 49/495.1

(58) Field of Classification Search
USPC ................... 49/475.1, 495.1, 496.1, 502, 199
See application file for complete search history.

(56) References Cited

U.S. PATENT DOCUMENTS

| | | | | |
|---|---|---|---|---|
| 4,370,832 A | * | 2/1983 | Koike | 49/490.1 |
| 4,874,201 A | * | 10/1989 | Scaglietti | 296/201 |
| 4,993,775 A | | 2/1991 | Keys | |
| 5,054,242 A | * | 10/1991 | Keys et al. | 49/490.1 |
| 5,199,761 A | * | 4/1993 | Dannecker et al. | 296/146.16 |
| 5,331,767 A | | 7/1994 | Takeuchi et al. | |
| 5,347,759 A | * | 9/1994 | Kobayashi et al. | 49/496.1 |
| 5,732,509 A | | 3/1998 | Buehler et al. | |
| 5,772,822 A | | 6/1998 | Dupuy | |
| 6,375,254 B1 | * | 4/2002 | Patz | 296/216.09 |
| 6,540,289 B2 | * | 4/2003 | Bergmiller et al. | 296/216.09 |
| 6,571,513 B2 | * | 6/2003 | Maass | 49/489.1 |
| 7,059,656 B2 | * | 6/2006 | Mikkaichi et al. | 296/146.15 |
| 7,854,094 B2 | * | 12/2010 | Zimmer et al. | 49/440 |
| 8,516,749 B2 | * | 8/2013 | Ash et al. | 49/480.1 |
| 2001/0034976 A1 | * | 11/2001 | Maass | 49/441 |
| 2006/0230685 A1 | * | 10/2006 | Bellemare | 49/496.1 |

OTHER PUBLICATIONS

International Search Report and Written Opinion for PCT/US2009/050250.

* cited by examiner

*Primary Examiner* — Jerry Redman
(74) *Attorney, Agent, or Firm* — Fay Sharpe LLP

(57) ABSTRACT

A method and resultant apparatus for a window seal assembly is shown and described. A thin layer of elastomer is introduced between a reinforcement member and a first surface of a window member. The subassembly of the glass member, elastomer, and rigid reinforcement is then introduced into a mold. Preferably, the thin layer of elastomer is provided by an extrusion process, such as on a metal reinforcement member, or as a co-extrusion process when an extruded reinforcement member is formed. A curable, elastomer/plastomer material is then injection molded to provide a flush glass appearance where an outer surface of the window is devoid of any seal material.

11 Claims, 2 Drawing Sheets

FLUSH QUARTER GLASS SEAL

This application claims the benefit of PCT International Patent Application No. PCT/US2009/050250, filed on 10 Jul. 2009, and claims the benefit of U.S. Provisional Patent Application Ser. No. 61/080,123, filed on Jul. 11, 2008, the disclosures of which are incorporated herein by reference.

BACKGROUND OF THE DISCLOSURE

This disclosure is directed to a seal assembly, and more particularly, an automotive seal of the type referred to as a glass seal. It finds particular application in association with an interface between adjacent movable front and rear windows. The disclosure is preferably of the type where a thickness or transverse dimension of the seal is preferably minimized, and more preferably does not include any portion extending to an outer surface of the window so as to minimize overall thickness, reduce wind noise, minimize thickness of the sash seal so that wear of the belt strip is reduced, eliminate an unappealing appearance on the outside of the vehicle, and reduce the amount of material and associated expense and component weight associated therewith to the vehicle.

Thus, a need exists for a new sash seal or flush quarter glass seal, for example, that is mounted over an edge of a window and overcomes the noted problems enumerated above.

SUMMARY OF THE DISCLOSURE

A glass seal assembly, particularly an edge seal or sash seal, includes a rigid reinforcement member such as a thin metal or rigid polymer material (e.g., rigid thermoplastic or thermoset material) that is disposed in spaced relation from a first planar surface or interior surface of the window. One of an elastomer or plastomer is provided between the reinforcement member and the inner surface of the window. This material is applied in a very thin, controlled layer thickness on the window surface or on the reinforcement member which are then joined together.

The reinforcement member is preferably a metal, although alternative materials may be used.

The reinforcement member has a portion extending in substantially parallel relation to the first planar surface of the window and includes another portion that extends beyond the edge of the window.

A method of forming a flush edge window seal assembly includes providing a first window member and a rigid reinforcement member, applying a thin layer of elastomer to a portion of one side of the reinforcement member and a first planar surface of the window, positioning at least a portion of the rigid reinforcement member on the first planar surface, and inserting the first window member, elastomer, and rigid reinforcement member in a mold.

The method further includes extruding the thin layer of elastomer onto the rigid reinforcement member.

The applying step may include coextruding the reinforcement member and elastomer together.

The method further includes introducing a curable material into the mold, wherein at least a portion of the rigid reinforcement member is covered by the curable material.

The method includes introducing the curable material that is substantially identical to the thin layer of elastomer.

A primary benefit of the present disclosure is the ability to provide a much thinner weatherseal design.

Another benefit resides in the reduced wear associated with the belt line seal.

Still another advantage resides in the reduced component weight.

Yet another attribute is a more aesthetically pleasing seal assembly.

Still other features and benefits of the invention will become more apparent from and understanding the following detailed description of the disclosure.

DETAILED DESCRIPTION OF THE PREFERRED EMBODIMENTS

Figure 1:
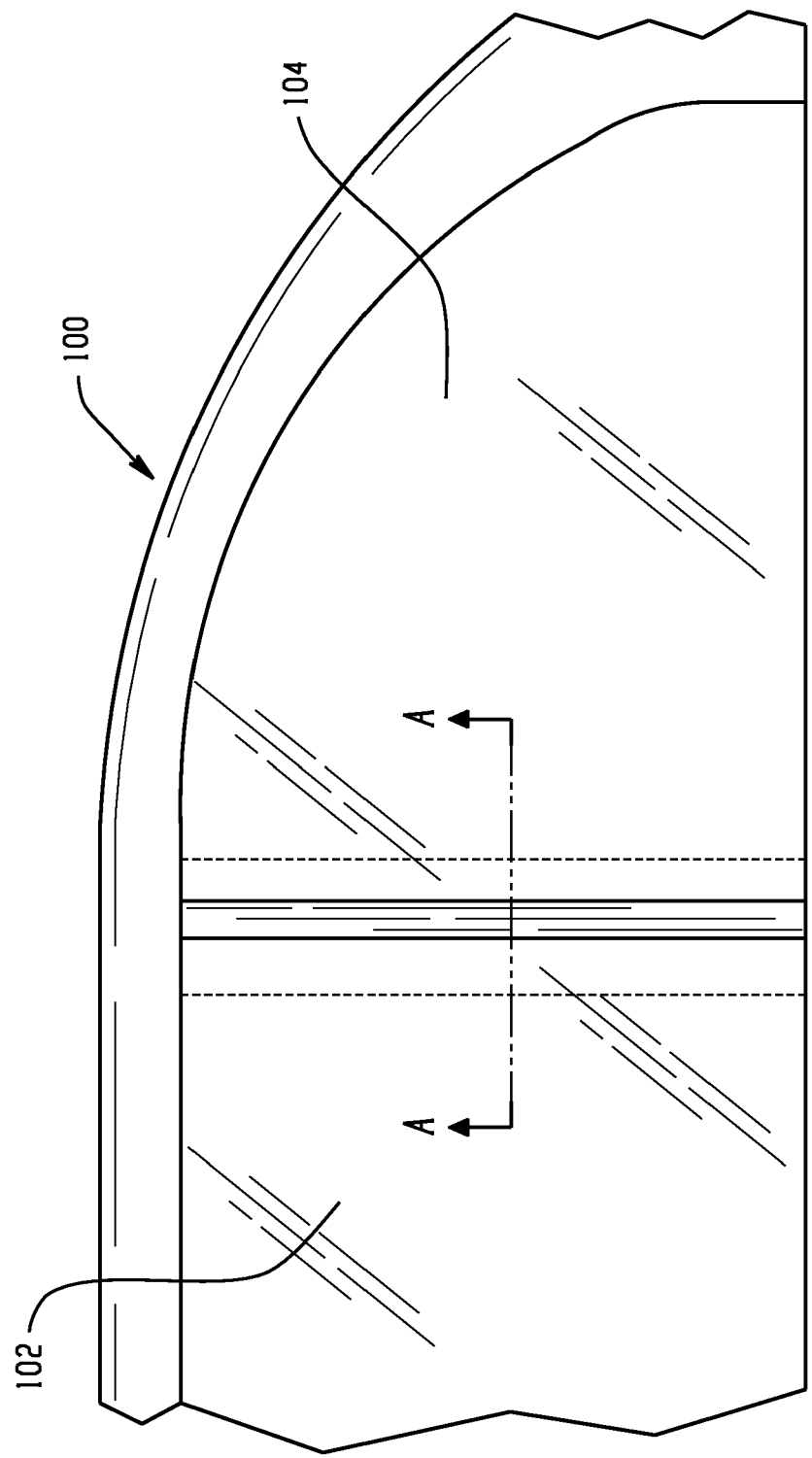
FIG. 1 is an elevational view of a portion of an automotive vehicle, particularly illustrating the interface between front and rear window portions.
Figure 2:
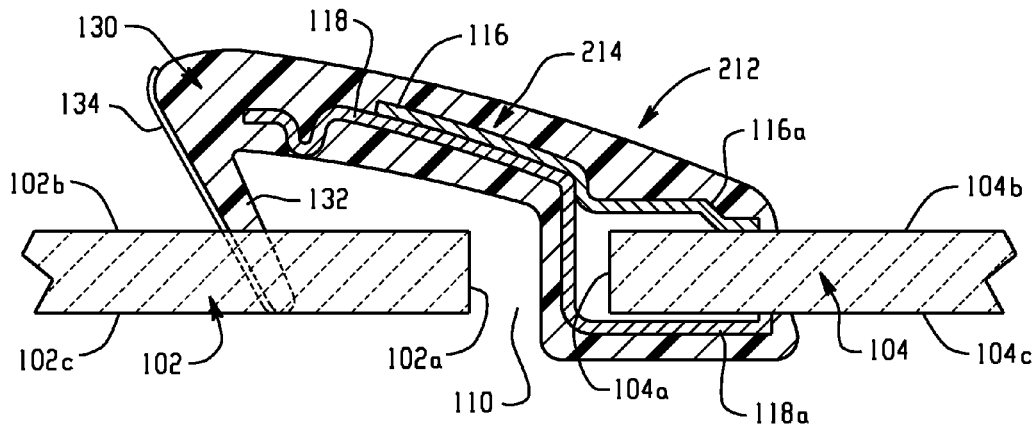
FIG. 2 is a cross-sectional view of a conventional sash seal, taken generally along the line A-A of FIG. 1.

FIG. 1 shows a portion of an automotive vehicle 100 and particularly, a front window 102 and a rear window 104. In this arrangement, it is contemplated that each of the windows, sometimes referenced to as glass, are moveable relative to a vehicle door or body in which they are received. For example, conventional window moving apparatus such as a regulator may be included and form no part of the present disclosure, so that further discussion herein is deemed unnecessary. The front and rear windows are separated by a gap 110 (FIG. 2). In other words, a rear edge 102a of the front window is spaced from a front edge 104a of the rear window. Generally, the front and rear windows are substantially co-planar so that first or inner surfaces 102b, 104b are substantially co-planar and likewise the second or outer surfaces 102c, 104c are substantially co-planar.

As shown in FIG. 2, a weatherseal assembly is provided at the gap between the windows. This is sometimes referred to as a sash seal or as a division bar between the front and rear windows. The weatherseal assembly 112 includes a rigid reinforcement member 114, shown here as first and second metal components 116, 118 that are joined together along portions thereof, typically through a spot welding operation. Typically, the reinforcing components 116, 118 are stamped metal that are subsequently spot-welded together. Because of the welding operation, coated metal typically cannot be used since the spot-welding process would adversely impact any coating provided thereon. Subsequently, the metal is coated for protective purposes. The metal reinforcing member includes portions 116a, 118a that are received on opposite surfaces of the rear window. That is, component 116a is adjacent the inner surface 104b of the rear window, while component 118a is disposed adjacent the outer surface 104c. This provides desired rigidity and strength to the seal assembly. The metal reinforcement member is then placed in a mold and an elastomer or plastomer material 130 is formed around the metal. This molded material would preferably include at least one seal fin 132 having a low friction coating 134, for example, thereon. In such an arrangement, the metal with the molded material, once it is cured, is then glued onto the rear window, particularly along edge 104a. As is evident, even though attempts are made to minimize the amount of material on the outer surface 104c, this seal assembly still results in material on the outer surface of the window.

It is also contemplated that the metal reinforcement member can be placed with the glass into a mold and the elastomer/plastomer 130 injected into the mold. Generally, however, this results in an undesired thickness of the elastomer. It is also difficult to provide for injection of the elastomer between the glass and the metal reinforcement member.

Figure 3:
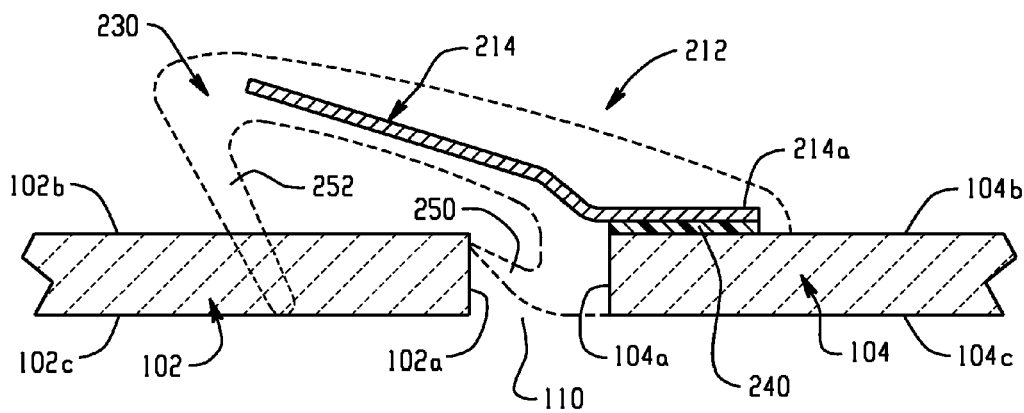
FIG. 3 is a cross-sectional view along the lines A-A of a portion of the seal assembly, i.e., the initial preparatory step of forming same.
Figure 4:
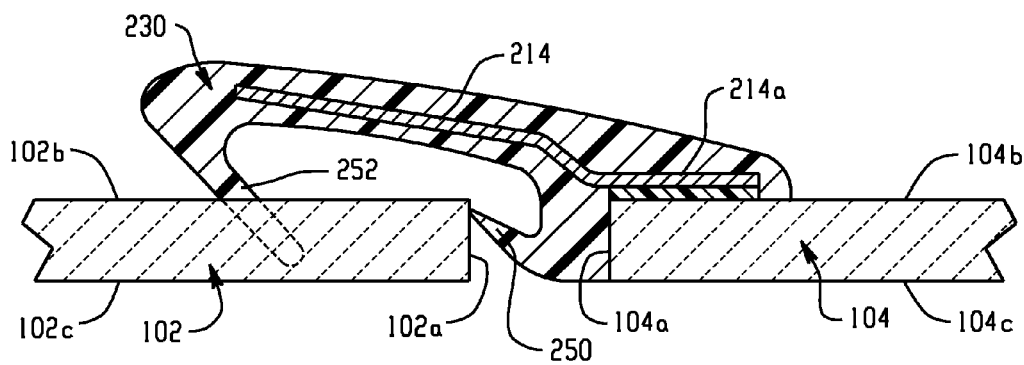
FIG. 4 is a similar cross-sectional view illustrating the completed seal assembly.

An improved weatherseal and a method of forming same is shown in FIGS. 3 and 4. The reference numerals regarding the windows are maintained for purposes of consistency, while new reference numerals are provided for the weatherseal assembly. More particularly, the weatherseal assembly 212 of the present disclosure includes a rigid reinforcement member 214. As evident in FIGS. 3 and 4, the reinforcement member is preferably a single-piece structure as opposed to an assembled piece that is formed from a welding operation of two separate components. It is common that the reinforcement member is metal, such as a stamped metal, to form a desired shape or configuration. It is also contemplated that the reinforcement member can be formed of a different material such as a rigid polymer, for example, a rigid thermoplastic or rigid thermoset material. Likewise, if metal is used, the metal can be purchased as a coated material to provide further protection and not encounter additional processing steps or expense as noted above in connection with the prior arrangement of FIG. 2. The coating not only protects the meal reinforcement member, but also advantageously enhances the bond with the elastomer/plastomer 230. More particularly, the metal reinforcement member can be bent to the desired shape for example in an in-line extrusion process. That is, a planar material is introduced at an upstream end of the line and one or more bending operations provide for deformation or progressive deformation of the reinforcement member into its final configuration.

Of particular note with respect to the reinforcement structure is that portion 214a is preferably substantially planar. This portion is substantially planar and disposed in substantially planar relation with the inner surface 104b of the rear window. A thin layer of material such as an elastomer 240 is applied to one of the reinforcement member or the inner surface 104b of the glass. In a preferred arrangement, the thin layer is an elastomer that is preferably extruded onto the metal reinforcement member. However, it is also contemplated that if the rigid reinforcement member is a non-metal and can be formed from an extrudable material, then the thin layer of elastomer 240 can be coextruded with the rigid reinforcement member. The thin layer is preferably provided on one surface of portion 214a that is disposed in facing relation with the inner surface 104b of the rear window. By extruding or co-extruding the elastomer, one can be assured that a controlled, thin elastomer layer is achieved between the reinforcement member and the window glass. This is to be contrasted with the arrangement of the prior art where careful control could not be effectively achieved. The reinforcement member with this uncured, thin layer of elastomer is introduced into a mold and after which a moldable material 230 is next introduced into the mold to at least partially encompass the reinforcement member. The thin layer 240 and the plastomer 230 do not have to be but could be the same material. The manufacturer need not be concerned with applying too much pressure against the reinforcement member or metal and, if desired, an elastomer- or rubber-to-metal adhesive may be provided on the metal to enhance the bond between the thin layer and the reinforcement member. Even under high pressures, the thin layer is maintained between the metal reinforcement member and the window glass.

As shown in FIG. 3, the elastomer/plastomer material 230 is represented in dotted line to indicate that this material is added in a subsequent step of the process. That is, the thin layer of elastomer/plastomer 240 is sandwiched between the reinforcement member 214 and the inner surface of the rear window 104. That sub-assembly is then placed in a mold and the elastomer material 230 is next injected into the mold. This assures that a flush interface is achieved, i.e., the outer surface 104c of the rear window (and likewise the outer surface 102c of the front window) is devoid of any seal material. As shown here, edge 104a of the rear window is encased in the elastomer 230, and a first seal fin 250 extends into sealing engagement with edge 102a of the front window. Likewise, a second seal fin 252 is formed in the molding operation. The second seal fin 252 is shown in an undeformed state in FIGS. 3 and 4, although one skilled in the art will recognize that seal fins 250, 252 are preferably biased into sealing engagement with the respective surfaces 102a, 102b of the front window.

Once cured, the seal assembly advantageously forms a strong bond with the rear window, while the reinforcement member provides the desired rigidity and strength to the seal assembly.

By this structure, the thickness of the seal is substantially reduced. This advantageously reduces undesired wear on the belt strip, such as when the rear window is raised and lowered relative to the door. The structure also improves the aesthetics or appearance on the outside of the vehicle because of the flush nature of the seal. Manufacture in accordance with the teachings of this disclosure also reduces the amount of material required and substantially reduces the component weight by approximately thirty percent (30%) or more. The improved manufacturing process is highly desirable since the process provides an extruded or co-extruded preform of elastomer on the reinforcement member. The manufacturer can carefully control the provision of a very thin layer of elastomer to reduce the overall thickness, and particularly reduce the thickness of the material between the glass and the reinforcement member, which is virtually impossible via an insert injection molding process.

The reinforcement member is preferably a thin metal, such as a stamped metal, or roll-formed metal, or even a combination of those forming processes. As noted above, reinforcement is not limited to metal and could be made of a thermoplastic or a thermosetting material, if desired. This will find particular application for example in a rear movable window glass in a hard-top vehicle, as well as the windows associated with convertible vehicles.

The invention has been described with reference to the preferred embodiment. Modifications and alterations will occur to others upon reading and understanding this specification. It is intended to include all such modifications and alterations in so far as they come within the scope of the appended claims or the equivalents thereof.

Having thus described the invention, it is now claimed:

1. A flush edge of glass seal assembly comprising:
  a first glass member having first and second opposed planar surfaces interconnected along an edge;
  a second glass member having first and second opposed planar surfaces interconnected along an edge, and facing edges of the respective first and second glass members spaced by a gap;
  a rigid reinforcement member spaced from the first planar surface of the glass;
  an elastomer interposed between at least the reinforcement member and the first planar surface of the first glass member, and the elastomer also extending along the edge of the first glass member while the second planar surface thereof is devoid of elastomer and does not extend beyond a plane defined by the second planar surface of the first glass member, a portion of the elastomer forming at least one seal lip that sealingly engages one of the edge of the second glass member or the second opposed planar surface of the second glass member.

2. The glass seal assembly of claim 1 wherein the rigid reinforcement member is metal.

3. The glass seal assembly of claim 1 wherein the elastomer is a rubber.

4. The glass seal assembly of claim 1 wherein the seal lip is includes a first seal fin contoured for sealing engagement with the edge of the second glass member.

5. The glass seal assembly of claim 4 further comprising a second seal fin that engages the first surface of the second glass member, and the second surface of the second glass member is devoid of elastomer.

6. The glass seal assembly of claim 5 wherein the first surface of the second glass member is devoid of elastomer.

7. The glass seal assembly of claim 1 wherein the reinforcement member extends in substantially parallel relation to the first planar surface of the glass member and includes a portion that extends beyond the glass edge.

8. The glass seal assembly of claim 1 further comprising a second glass member disposed in substantially planar relation with the first glass member.

9. The glass seal assembly of claim 8 wherein the first glass member is a rear quarter glass panel and the second glass member is a front glass window of an automotive vehicle.

10. The glass seal assembly of claim 9 wherein the reinforcement member overlaps at least portions of each of the front and rear glass members.

11. The glass seal assembly of claim 1 wherein the elastomer does not extend beyond a plane defined by the second planar surface of the second glass member.

* * * * *

UNITED STATES PATENT AND TRADEMARK OFFICE
CERTIFICATE OF CORRECTION

PATENT NO. : 8,667,739 B2  Page 1 of 1
APPLICATION NO. : 13/003703
DATED : March 11, 2014
INVENTOR(S) : Marc Brookman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 609 days.

Signed and Sealed this

Twenty-ninth Day of September, 2015

Michelle K. Lee
*Director of the United States Patent and Trademark Office*